United States Patent
Menzel et al.

(10) Patent No.: US 11,399,289 B2
(45) Date of Patent: Jul. 26, 2022

(54) DEVICE AND METHOD FOR VEHICLE-TO-X COMMUNICATION IN ACCORDANCE WITH A DEGREE OF TRUST

(71) Applicant: Continental Teves AG & Co. oHG, Frankfurt am Main (DE)

(72) Inventors: Marc Menzel, Nuremberg (DE); Ulrich Stählin, Nuremberg (DE)

(73) Assignee: Continental Teves AG & Co. oHG

(*) Notice: Subject to any disclaimer, the term of this patent is extended or adjusted under 35 U.S.C. 154(b) by 0 days.

(21) Appl. No.: 15/733,978

(22) PCT Filed: May 28, 2019

(86) PCT No.: PCT/DE2019/200047
§ 371 (c)(1),
(2) Date: Dec. 1, 2020

(87) PCT Pub. No.: WO2020/007422
PCT Pub. Date: Jan. 9, 2020

(65) Prior Publication Data
US 2021/0219139 A1    Jul. 15, 2021

(30) Foreign Application Priority Data
Jul. 4, 2018    (DE) .................. 10 2018 211 008.5

(51) Int. Cl.
*H04W 12/60*    (2021.01)
*H04W 4/40*    (2018.01)
*H04W 12/69*    (2021.01)

(52) U.S. Cl.
CPC ............. *H04W 12/66* (2021.01); *H04W 4/40* (2018.02); *H04W 12/69* (2021.01)

(58) Field of Classification Search
CPC ....... H04W 12/66; H04W 4/40; H04W 12/69; H04W 4/46; H04W 12/08; H04L 9/3247
(Continued)

(56) References Cited

U.S. PATENT DOCUMENTS 9,419,802 B2 * 8/2016 Lortz ................... H04L 9/3247
10,843,703 B2 * 11/2020 Lin ....................... G01C 25/00
(Continued)

FOREIGN PATENT DOCUMENTS

DE    102010029418 A1    12/2010
DE    102015011920 A1    3/2017
(Continued)

OTHER PUBLICATIONS

Gisdakis et al.; "SEROSA: SERvice Oriented Security Architecture for Vehicular Communications", 2013, IEEE Vehicular Networking Conference, pp. 111-118. (Year: 2013).*
(Continued)

*Primary Examiner* — Matthew Smithers
(74) *Attorney, Agent, or Firm* — RatnerPrestia

(57) ABSTRACT

A vehicle-to-X communication device for a vehicle, containing: a sending device for sending out vehicle-to-X messages, a receiving device for receiving vehicle-to-X messages, and a processing apparatus for processing vehicle-to-X messages to be sent and received. The communication device is configured to send out information for identifying a manufacturer of the vehicle and is furthermore configured to determine, by the processing apparatus, a level of trust of a vehicle-to-X message of a further vehicle received by the receiving device, utilizing information for identifying a manufacturer of the further vehicle which is contained by the vehicle-to-X message of the further vehicle. Furthermore, a corresponding method is disclosed.

15 Claims, 2 Drawing Sheets

(58) Field of Classification Search
CPC .............. H04L 9/3263; H04L 2209/84; H04L 63/0823; H04L 67/12; H04L 63/06; G08G 1/161
See application file for complete search history.

(56) References Cited

U.S. PATENT DOCUMENTS

| | | | |
|---|---|---|---|
| 10,911,245 B2* | 2/2021 | Pottier | H04L 9/3226 |
| 2003/0147534 A1* | 8/2003 | Ablay | H04L 9/3271 |
| | | | 713/170 |
| 2007/0223702 A1* | 9/2007 | Tengler | H04L 9/3263 |
| | | | 380/270 |
| 2012/0077430 A1* | 3/2012 | Stubbing | G08G 1/161 |
| | | | 455/39 |
| 2015/0200957 A1* | 7/2015 | Zhang | G08G 1/163 |
| | | | 726/22 |
| 2016/0280370 A1* | 9/2016 | Canavor | G05D 1/104 |
| 2017/0310674 A1* | 10/2017 | Markham | H04L 63/0435 |
| 2018/0035276 A1* | 2/2018 | Kang | H04W 48/08 |
| 2018/0255562 A1* | 9/2018 | Cho | H04W 12/06 |
| 2018/0322785 A1* | 11/2018 | Jerichow | G08G 1/0141 |
| 2019/0068361 A1* | 2/2019 | Ye | H04W 4/48 |
| 2019/0098088 A1* | 3/2019 | Baltar | H04W 4/40 |
| 2019/0226849 A1* | 7/2019 | Lindemann | G06F 16/29 |
| 2019/0238343 A1* | 8/2019 | Racklyeft | H04L 63/06 |
| 2020/0057872 A1* | 2/2020 | Ingraham | H04L 9/3226 |

FOREIGN PATENT DOCUMENTS

| | | |
|---|---|---|
| DE | 102016207984 B3 | 7/2017 |
| DE | 102015107745 A1 | 11/2018 |
| EP | 3232416 A1 | 10/2017 |
| WO | WO-2016160593 A1 * 10/2016 ........... B64C 39/024 |

OTHER PUBLICATIONS

German Search Report for German Application No. 10 2018 211 008.5, dated Nov. 20, 2018 with partial translation, 10 pages.
International Search Report and Written Opinion for International Application No. PCT/DE2019/200047, dated Jul. 18, 2019, 12 pages with partial English translation.
International Search Report and Written Opinion for International Application No. PCT/DE2019/200047, dated Jul. 18, 2019, 17 pages (German).

* cited by examiner

DEVICE AND METHOD FOR VEHICLE-TO-X COMMUNICATION IN ACCORDANCE WITH A DEGREE OF TRUST

CROSS REFERENCE TO RELATED APPLICATIONS

This application is the U.S. National Phase application of PCT International Application No. PCT/DE2019/200047, filed May 28, 2019, which claims priority to German Patent Application No. 10 2018 211 008.5, filed Jul. 4, 2018, the contents of such applications being incorporated by reference herein.

FIELD OF THE INVENTION

The present invention relates to a vehicle-to-X communication device and to a corresponding method.

BACKGROUND OF THE INVENTION

Vehicle-to-X communication (V2X) based on IEEE 802.11p is currently in the process of being launched onto the market. Vehicle-to-X communication based on dedicated short-range communication (DSRC or ITS-G5) operates in a frequency band around 5.9 GHz. The close coupling of the vehicle dynamics of following vehicles, so-called platooning, for example utilizing vehicle-to-vehicle communication, is currently being implemented in production.

Certificates for increasing communication security (security) in vehicle-to-X communication are in principle known. DE 10 2010 029 418 A1, incorporated herein by reference, describes a method in which certificates for vehicle-to-X communication are in addition updated by means of an infrastructure unit.

With vehicle-to-X communication, the aim is not only to warn about risks but also to actively intervene in the vehicle dynamics in order to prevent risks or, as in the case of platooning, to take over parts of the task of driving from the driver. However, the traditional analyses such as, by way of example, functional safety analysis (FSM), and procedures, for example in accordance with ISO 26262, reach their limits with this cooperative approach or have gaps which have not yet generally been overcome.

SUMMARY OF THE INVENTION

The aspect of the invention is to provide a possibility with which functional safety can also be guaranteed for cooperative systems.

An aspect of the invention describes a vehicle-to-X communication device for a vehicle, containing a sending device for sending out vehicle-to-X messages, a receiving device for receiving vehicle-to-X messages, and a processing apparatus for processing vehicle-to-X messages to be sent and received, wherein the communication device is configured to send out information for identifying a manufacturer of the vehicle and is furthermore configured to determine, by means of the processing apparatus, a level of trust of a vehicle-to-X message of a further vehicle received by means of the receiving device, utilizing information for identifying a manufacturer of the further vehicle which is contained by the vehicle-to-X message of the further vehicle.

The vehicle can be a motor vehicle, in particular a car, a truck, a motorcycle, an electric vehicle or a hybrid vehicle, a vessel or an aircraft.

The vehicle-to-X messages sent out can then be received by a receiving device. The receiving device can be part of a vehicle-to-X communication device of a further vehicle which can also be referred to as a second vehicle. The receiving device can, however, in principle also be part of a corresponding communication device of an infrastructure device such as, by way of example, traffic lights or a transmitting mast, or of a (mobile) road user such as, by way of example, a pedestrian or a cyclist.

The idea which forms the basis of an aspect of the invention is that functions which require safeguarding in the sense of functional safety are only effected, for the time being, between vehicles of the same manufacturer or vehicles of affiliated manufacturers. By transmitting information identifying the manufacturer of the vehicle, a receiver of the information is enabled to determine what level of trust can be placed in the sender. Consequently, an evaluation of the functional safety (e.g. according to ASIL) is advantageously also made possible for cooperative functions of the vehicle-to-X communication. Vehicles of the same manufacturer are, in particular, understood to be vehicles of the same vehicle brands. Vehicles of manufacturers affiliated to a manufacturer are in particular vehicles of other vehicle brands which belong to the same group of companies, or vehicles of other vehicle brands which have agreed on a common solution with the manufacturer, for example a bilateral or multilateral agreement, a quasi-standard and/or a standard.

In accordance with an embodiment, the communication device is configured to send out a vehicle-to-X message for identifying the manufacturer of the vehicle, which forms a standalone message type and contains the information for identifying the manufacturer of the vehicle. By sending out a separate message of a standalone data type, the standard conformity of already standardized message types such as, for example, a "Cooperative Awareness Message" (CAM), "Decentralized Environment Notification Message" (DENM), "Basic Safety Message" (BSM) or "Signal Phase and Timing" (SPAT) can be retained. Furthermore, higher-value functions can already be implemented, prior to industry-wide standardization, without possibly having a negative effect on other vehicle-to-X functions. Alternatively or in addition, the information can be contained by a vehicle-to-X message of another message type.

In accordance with an embodiment, the vehicle-to-X message for identifying the manufacturer contains identification information for identifying the vehicle in the vehicle-to-X network. For example, this is a network address, an IMEI, IMSI or MAC address. Consequently, it is advantageously possible to clearly identify a vehicle sending a vehicle-to-X message in the vehicle-to-X network.

In accordance with an embodiment, the vehicle-to-X message contains a digital signature. For example, the vehicle-to-X message is provided with a digital certificate and/or root certificate. According to a further development, the digital signature can be assigned to a manufacturer of vehicles. Consequently, the information for identifying the manufacturer can, according to a further development, be realized by means of the digital signature. Alternatively or in addition, the information for identifying the manufacturer of the vehicle is made up of a user data part and/or a header data portion of the vehicle-to-X message. Alternatively or in addition to a digital signature of the vehicle-to-X message, the vehicle-to-X message is encrypted by means of a manufacturer-related key, in accordance with an embodiment, prior to being dispatched. Manufacturer-related is in particular understood to mean that merely vehicles of the same manufacturer or affiliated manufacturers are authorized to decrypt the vehicle-to-X message by means of a corresponding key.

According to a further development, methods for protecting privacy defined by a standard for vehicle-to-X communication are used for the manufacturer-related certificates. These are, for example, certificate exchanges after a predefined time.

In accordance with an embodiment, the vehicle-to-X message can furthermore contain:

information regarding the technical equipment of the vehicle sending the message, information regarding the age of the vehicle sending the message, information regarding implementation details of hardware modules and/or software modules used in the vehicle sending the message, information regarding the manufacturer of hardware modules and/or software modules used in the vehicle sending the message, and/or information regarding a certification level of the vehicle sending the message, for example only self-certification or externally confirmed/performed certification, level of the certification, etc.

In accordance with an embodiment, the communication device is configured to process information for identifying a manufacturer of the further vehicle received from a further vehicle.

In accordance with an embodiment, the communication device is configured to process a vehicle-to-X message received from a further vehicle, utilizing information for identifying a manufacturer of the further vehicle contained by said vehicle-to-X message.

In accordance with an embodiment, the communication device is configured to obtain the information for identifying a manufacturer of the further vehicle from a vehicle-to-X message of a standalone message type received from a further vehicle.

In accordance with an embodiment, the communication device is configured to utilize the information identifying a manufacturer of the further vehicle for assigning a vehicle-to-X message already received and/or still to be received to the manufacturer. In accordance with an embodiment, the communication device is configured to carry out the assignment, on the basis of the identification information for identifying the further vehicle already received and/or to be received, in the vehicle-to-X network. Usually, the previously standardized message types contain information clearly identifying the relevant sender in particular within a current ad-hoc network. If the identification information of the vehicle is also sent with the vehicle-to-X message which identifies the manufacturer of a vehicle, it is possible to assign messages already received or still to be received from a further vehicle to the information regarding the manufacturer.

In accordance with an embodiment, the communication device is configured to determine a level of trust of a vehicle-to-X message received and/or to be received from the further vehicle based on the information for identifying the manufacturer of the further vehicle. In other words, a level of trust is specified depending on the manufacturer of the vehicle sending a message. The receiver is consequently enabled to determine which level of trust is to be placed in the sender or the vehicle-to-X messages sent out by the latter. A classification into trustworthy and not trustworthy or graduations hereof can, for example, be provided for the classification of the level of trust.

In accordance with an embodiment, the communication device is configured to influence the execution of at least one vehicle function depending on the determined level of trust. According to a further development, the functionality is augmented if the level of trust increases or is high, and it is reduced if the level of trust falls or is low. The setting of parameters regarding this is in particular application-specific. The influencing of the execution can provide for a deactivation or activation and/or a gradual downgrading or extension of the functionality. The vehicle functions dependent on the level of trust include, in accordance with a further development, a cooperative function for controlling the vehicle, which is in particular understood to include a function, the execution of which can be influenced by information which has been obtained by means of vehicle-to-X communication. Examples of these types of vehicle functions are driver assistance functions which are extended or reduced depending on the determined level of trust. In the case of platooning, the coupling into a platoon can, by way of example, be advantageously excluded in the case of a low level of trust and the coupling to a convoy can be permitted in the case of a high level of trust. The influencing is effected in accordance with an embodiment in such a manner that the communication device transmits a corresponding control instruction or information to an electronic control unit executing the vehicle function by means of an interface provided for this purpose, for example via a data bus.

In particular in the event that the information for identifying the manufacturer is implemented by means of a digital signature, the communication device is configured according to an embodiment to carry out a corresponding processing of the type indicated above.

If the vehicle-to-X message has been encrypted by means of a manufacturer-related key prior to being sent out, the communication device is configured to carry out the decryption according to an embodiment in the event of a corresponding key being present.

In accordance with a further development of the communication device, the latter is embodied to utilize one or more of the additional pieces of information indicated above contained by a received vehicle-to-X message for identifying the manufacturer of the vehicle for the determination of a level of trust of the vehicle-to-X message.

According to a further aspect of the invention, the communication device is designed to perform a method in accordance with at least one of the embodiments described below.

In a further development of the indicated communication device, the indicated device has a memory and a processor. The indicated method is stored in the form of a computer program in the memory and the processor is provided to execute the method, if the computer program is loaded from the memory into the processor.

According to a further aspect of the invention, a computer program contains program code means in order to perform all the steps of one of the indicated methods, if the computer program is run on a computer or one of the indicated devices.

According to a further aspect of the invention, a computer program product contains a program code which is saved on a computer-readable data carrier and which, if it is run on a data processing apparatus, performs one of the indicated methods.

Furthermore, an aspect of the invention describes a method for realizing functional safety for a vehicle-to-X network, having the steps of:

sending out a vehicle-to-X message by means of a sending device for sending out vehicle-to-X messages by a vehicle, wherein the vehicle-to-X message contains information for identifying a manufacturer of the vehicle sending out the vehicle-to-X message, receiving the vehicle-to-X message by means of a receiving device for receiving vehicle-to-X messages of a further vehicle and determining a level of trust of the received vehicle-to-X message, utilizing the information for identifying the manufacturer by a processing apparatus of the further vehicle.

Further embodiments of the method according to the invention are produced, during implementation, from embodiments of the communication device according to the invention.

BRIEF DESCRIPTION OF THE DRAWINGS

Some particularly advantageous configurations of aspects of the invention are indicated in the subclaims. Further preferred embodiments are also set out by the following description of exemplary embodiments with reference to schematically represented figures, wherein:

DETAILED DESCRIPTION OF THE PREFERRED EMBODIMENTS

Figure 1:
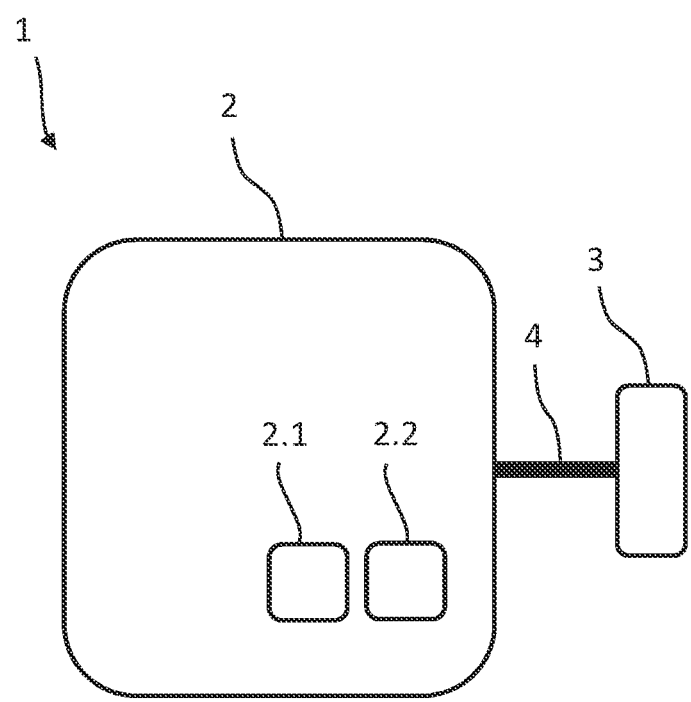
FIG. 1 shows an exemplary embodiment of a communication device according to an aspect of the invention.

FIG. 1 shows a vehicle-to-X communication device 1 for a vehicle, containing a processing apparatus 2 and an antenna 3 for sending or receiving vehicle-to-X messages. The processing device 2 is connected to the antenna 3 by means of a line 4, e.g. a coaxial line. Furthermore, the processing device 2 has a processor 2.1 and a memory 2.2. The communication device is configured to send out information for identifying a manufacturer of the vehicle having the communication device. A further vehicle is configured by means of an embodiment of the communication device to receive the vehicle-to-X message and, by means of this, to also process the information for identifying a manufacturer of the vehicle. Furthermore, the communication device of the receiving further vehicle is configured to determine a level of trust of a vehicle-to-X message received and/or still to be received from the vehicle based on the information for identifying the manufacturer of the further vehicle. Depending on the level of trust which is determined in such a manner, the communication device is moreover configured to influence a vehicle function.

Figure 2:
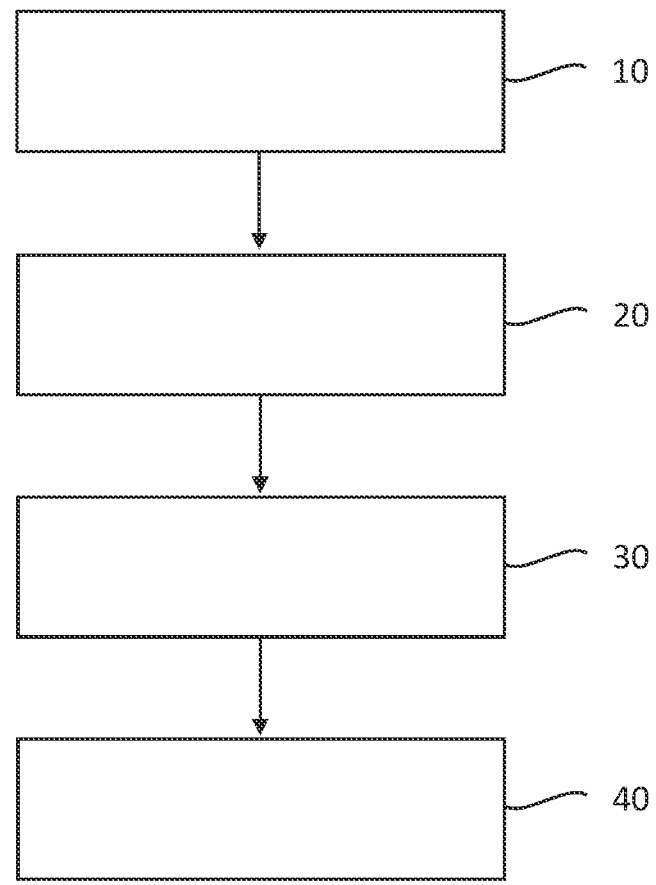
FIG. 2 shows an exemplary embodiment of a method according to an aspect of the invention.

FIG. 2 shows an embodiment of the method according to an aspect of the invention for realizing functional safety for a vehicle-to-X network. In a step 10, a vehicle-to-X message is sent out by a vehicle, wherein the vehicle-to-X message contains information for identifying a manufacturer of the vehicle sending out the vehicle-to-X message. In a further step 20, the vehicle-to-X message sent out is received by a further vehicle. In a step 30, the further vehicle determines a level of trust of the received vehicle-to-X message, utilizing the information for identifying the manufacturer of the vehicle by means of a processing apparatus of the communication device. In the further step 40, the execution of a vehicle function is influenced depending on the determined level of trust.

If in the course of the proceedings it transpires that a feature or a group of features is not absolutely necessary, then the applicant here and now seeks a wording of at least one independent claim, no longer containing the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or exemplary embodiments and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are merely disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which is therefore to be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). Aspects of the invention expressly do not, however, exclude vehicle-to-X communication with the intermediary of, for example, a mobile network.

The invention claimed is:

1. A vehicle-to-X communication device for a vehicle, comprising:
   a sending device for sending out vehicle-to-X messages;
   a receiving device for receiving vehicle-to-X messages; and
   a processing apparatus for processing vehicle-to-X messages to be sent and received, wherein the vehicle-to-X communication device is configured to:
   receive, by the receiving device, a vehicle-to-X message including information identifying a manufacturer of a further vehicle,
   determine, by the processing apparatus, a level of trust of the vehicle-to-X message received from the further vehicle based on whether the manufacturer of the further vehicle is determined to be the same as a manufacturer of the vehicle, and
   control, by the processing apparatus, the vehicle based on the determined level of trust.

2. The vehicle-to-X communication device according to claim 1, configured to send out a vehicle-to-X message for identifying a manufacturer of the vehicle, which forms a standalone message type and contains information for identifying the manufacturer of the vehicle.

3. The vehicle-to-X communication device according to claim 2, wherein the vehicle-to-X message for identifying the manufacturer of the vehicle contains identification information for identifying the vehicle in the vehicle-to-X network.

4. The vehicle-to-X communication device according to claim 3, wherein the information for identifying the manufacturer of the vehicle is made up of a user data part contained by the vehicle-to-X message and/or a header data portion and/or a digital signature.

5. The vehicle-to-X communication device according to claim 2, wherein the information for identifying the manufacturer of the vehicle is made up of a user data part contained by the vehicle-to-X message and/or a header data portion and/or a digital signature.

6. The vehicle-to-X communication device according to claim 2, configured to encrypt the vehicle-to-X message by a manufacturer-related key prior to the vehicle-to-X message being sent out.

7. The vehicle-to-X communication device according to claim 2, wherein the vehicle-to-X message furthermore contains:
   information regarding technical equipment of the vehicle sending the message,
   information regarding an age of the vehicle sending the message,
   information regarding implementation details of hardware modules and/or software modules used in the vehicle sending the message,
   information regarding a manufacturer of hardware modules and/or software modules used in the vehicle sending the message, and/or
   information regarding a certification level of the vehicle sending the message.

8. The vehicle-to-X communication device according to claim 1, configured to process information for identifying a manufacturer of the further vehicle received from the further vehicle.

9. The vehicle-to-X communication device according to claim 8, configured to utilize the information for identifying the manufacturer of the further vehicle for assigning a vehicle-to-X message already received and/or to be received to the manufacturer.

10. The vehicle-to-X communication device according to claim 9, configured to carry out the assignment, on the basis of the identification information for identifying the further vehicle already received and/or to be received, in the vehicle-to-X network.

11. The vehicle-to-X communication device according to claim 8, configured to determine a level of trust of a vehicle-to-X message received and/or to be received from the further vehicle based on the information for identifying the manufacturer of the further vehicle.

12. The vehicle-to-X communication device according to claim 11, configured to influence execution of a vehicle function depending on the determined level of trust.

13. The vehicle-to-X communication device according to claim 1, configured to process at least one vehicle-to-X message received from the further vehicle, utilizing information for identifying a manufacturer of the further vehicle contained by said vehicle-to-X message.

14. The vehicle-to-X communication device according to claim 13, configured to utilize the information for identifying the manufacturer of the further vehicle for assigning a vehicle-to-X message already received and/or to be received to the manufacturer.

15. A method for realizing functional safety for a vehicle-to-X network, comprising:
   receiving, by a receiving device of a vehicle-to-X communication device of a vehicle, a vehicle-to-X message including information identifying a manufacturer of a further vehicle;
   determining, by a processing apparatus of the vehicle-to-X communication device of the vehicle, a level of trust of the vehicle-to-X message received from the further vehicle based on whether the manufacturer of the further vehicle is determined to be the same as a manufacturer of the vehicle; and
   controlling, by the processing apparatus, the vehicle based on the determined level of trust.

* * * * *